United States Patent

[11] 3,534,766

| [72] | Inventor | William J. Barto |
| | | Philadephia, Pennsylvania |
| [21] | Appl. No. | 682,069 |
| [22] | Filed | Nov. 13, 1967 |
| [45] | Patented | Oct. 20, 1970 |
| [73] | Assignee | Eaton, Yale & Towne Inc. |
| | | Cleveland, Ohio |
| | | a corporation of Ohio |

[54] INDUSTRIAL TRUCK HYDRAULIC HOSE GUIDE
7 Claims, 4 Drawing Figs.

[52] U.S. Cl. ............................................. 137/351,
 74/230.3, 137/355.17
[51] Int. Cl. ................................................. B66f 9/06
[50] Field of Search ........................ 242/(Inquired w/exam;)
 214/(Inquired w/exam;) 137/355.12, 355.16,
 355.17, 355.18, 355.19, 355.2, 355.21, 355.22,
 355.23, 355.24, 355.25, 355.26, 355.27, 355.28,
 580; 308/(Inquired w/exam;) 74/(Inquired w/exam;)
 74/230.3, 230.01

[56] References Cited
UNITED STATES PATENTS

| 1,740,748 | 12/1929 | Read | 137/355.17 |
| 1,914,654 | 6/1933 | Tornblom | 137/355.17 |
| 2,632,262 | 3/1953 | Whittey | 137/351X |
| 2,735,717 | 2/1956 | Harman | 137/580X |
| 2,781,055 | 2/1957 | Jackson | 137/580 |
| 2,997,721 | 8/1961 | Hopfeld | 137/351X |
| 3,006,382 | 10/1961 | Broome | 74/230.01 |
| 3,111,856 | 11/1963 | Backofen | 74/230.3 |
| 3,125,126 | 3/1964 | Engels | 74/230.4X |
| 3,330,459 | 7/1967 | Cullen et al. | 137/355.25X |
| 3,381,704 | 5/1968 | Richardson | 137/580X |

*Primary Examiner*—Samuel Scott
*Attorney*—Teagno and Toddy

ABSTRACT: One or more hydraulic hose-guiding reels, as may be needed, are integrally secured by bolts in axial relation to a load wheel that engages a lifting chain on an industrial truck, and there is a circular bushing mounted for rotation on the periphery of each reel. The bushing is held assembled between a flange on the reel and a surface on an adjoining reel or the load wheel. The periphery of the bushing has a depression in which a hose is reeved. Should the hose bind on the bushing, as may happen due to high fluid pressure applied to the hose, the rotatable bushing will prevent the hose from binding relatively to the load wheel, or to a hose on another reel.

Patented Oct. 20, 1970
3,534,766
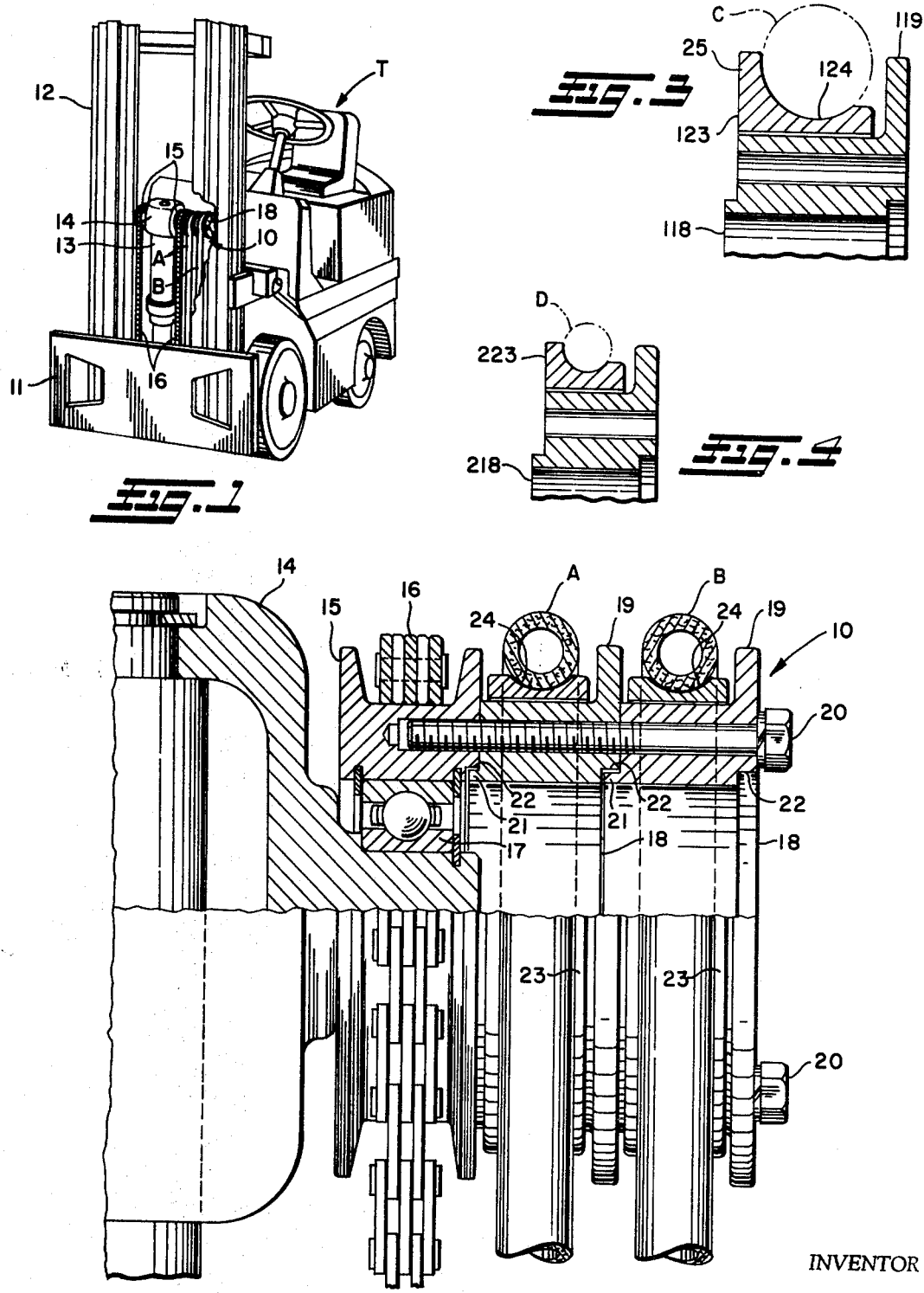
INVENTOR
W. J. BARTO
BY
ATTORNEYS

3,534,766

INDUSTRIAL TRUCK HYDRAULIC HOSE GUIDE

SPECIFICATION

This invention relates to industrial trucks, and more particularly to the reeving of hose for conducting hydraulic pressures on an industrial truck.

As will be appreciated, many industrial trucks are equipped with attachments that utilize hydraulic mechanisms such as rams for manipulating a load. Naturally, it is necessary to transmit hydraulic fluid from a source of fluid pressure to each hydraulic ram used, and back from each hydraulic ram to the source of pressure. Sometimes there are two, three or more load-manipulating hydraulic rams, and therefore there may be several hydraulic hose, one pair for each ram or mechanism. The attachment and its rams generally are mounted on a load lifting carriage which causes each hose to move a considerable amount as the carriage moves relatively to the truck. Therefore, guide reels are mounted on the truck for holding the hose and for facilitating their movements, and for keeping the several hose in a desired relation to one another.

Considerable problems arise when utilizing reels to guide hose of the particular class on an industrial truck. It has been found that this is due to the fact that the hose when accepting hydraulic pressure will stiffen and bind in the reel that is guiding the hose. The hose then may tend to leave the reel and when held in position, as is necessary, may lock relatively to the reel. Obviously, this can cause rather serious damage. There is even more difficulty where several reels are mounted in axial relationship, with hose on each reel. Then, if there is low pressure in a hose while high pressure is developed in another hose, and with the reels mounted for rotation together, there must be slippage between at least one hose and the reel on which it is guided. The slippage alone causes considerable damage.

The novel concept of my invention will enable a hose of the particular class to be guided on a reel without binding and without slippage of the hose, even when the hose is stiffened because of the transmission therethrough of fluid under high pressure. As a feature of my invention, I equip a reel with a bushing between it and the hose for accepting such binding forces as are developed by the hose. By rotating relatively to the reel, the bushing will prevent binding of the hose relatively to the reel even though the hose may possibly bind on the bushing. Naturally, also, the hose never need slip on the bushing.

As a further feature of the invention, I may utilize a bushing when the reel is itself secured relatively to the truck. Also, when several reels are assembled so as to rotate together, and bushings are utilized on certain of the reels, there can be no binding established between any of the hose.

As a still further specific feature of the invention, my reel is adapted for mounting on a rotatable element carried by the industrial truck so as to rotate with the element, while the bushing on the reel will contribute guiding action to a hose without in any way binding the hose relatively to the rotatable element to which the reel is secured.

While my invention will be particularly effective for the guiding of hydraulic hose, it also may be used to advantage where an industrial truck has an electric power line that must be guided, since it will facilitate movements of that line.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention in order to prevent the appropriation of my invention by those skilled in the art.

In the drawings:

FIG. 1 shows an industrial lift truck utilizing my novel hydraulic hose guide.

FIG. 2 is a partly sectional view illustrating the construction of my guide.

FIGS. 3 and 4 are sectional views showing forms of parts that I may utilize.

Referring now more particularly to FIG. 1 of the drawings, I indicate my novel hose guide generally by the numeral 10, and I show the guide 10 mounted on an industrial truck T of a usual type having a load carriage 11 moving vertically on uprights 12. A lift ram 13 is mounted on the truck T, and supports a cross head 14 that is equipped with a pair of load wheels 15 engaging lift chains 16. A bearing 17, one of which is seen in FIG. 2, mounts each load wheel 15 for rotation on the cross head 14. As will be appreciated by persons skilled in the art, lift ram 13 by extending will cause chains 16 to move over load wheels 15 while lifting the load carriage 11. The hose guide 10 will be mounted on one of the load wheels 15 so as to guide hydraulic hose A and B that may extend between the truck T and load carriage 11 for conducting fluid pressure relatively to load-manipulating attachments, not shown, that may be mounted on carriage 11.

In the novel concept of my invention, the hose guide 10 includes one or more reels 18, FIG. 2, each having the shape of a circular band on one end of which is a flange 19 extending radially outward. I have chosen to show each reel or band 18 formed to have approximately the same diameter as a load wheel 15, though that actually is not necessary in my invention, as will appear. The reels 18 are integrally secured to one of the load wheels 15, as by bolts 20 entered through corresponding openings in the reels 18 and threaded into openings in load wheel 15. In effect the reels 18 then form one reel secured in position with its center coincidental with the axis of rotation of the wheel 15. I prefer to form each reel 18 with an end flange 21 that is adapted to engage an opposed end recess 22 on an adjoining reel 18 or on load wheel 15, acting further to hold the reels in position.

I assemble upon the outer surface of each reel 18 a bushing 23 that will lie in position between the flange 19 of the particular reel, and a surface that is presented either by an adjoining reel flange 19 or by the load wheel 15. I particularly form the bushing 23 so as to have clearance that will permit it to rotate on its reel 18. The outer periphery of bushing 23 has a depression 24 that will accept a corresponding hydraulic hose A or B, guiding that hose.

It naturally will be understood that a hose will have some friction relatively to its bushing 23. Therefore, the hose conceivably may tend to bind somewhat relatively to the bushing, as when a high degree of fluid pressure is suddenly applied to the hose. Nevertheless, the hose cannot bind relatively to its reel 18 because bushing 23 is free to rotate. For the same reason, a hose never need slip in contact with its bushing 23. It will be seen further that no binding stresses can be transferred between load wheel 15 and a hose, since that wheel actually can rotate independently of the bushing 23 that engages that hose. Moreover, when utilizing my invention for guiding two or more hose, a binding action of one hose will not affect another hose. In fact, where it merely important to prevent a transfer of stresses between two hose, there need be only one reel that is equipped with a bushing 23.

Referring now to FIG. 3, I show a further form of bushing, indicated by the numeral 123, that I may utilize for guiding a hose. Bushing 123 is quite like the bushing 23 that I have described, but is further formed at one side of depression 124 with a relatively high lip 25 that will be in opposed relation to the flange 119 of reel 118. That lip 25 will offer somewhat closer guidance, should that be desired for a hose such as hose C that I show in phantom lines in FIG. 3. The reel 118 is constructed in the same manner as I have described in connection with the reel 18, but I do show reel 118 formed somewhat longer in an axial direction, that being due to the fact that I show it utilized with a hose C that is relatively large.

In FIG. 4, I show a reel 218 equipped with a lipped bushing 223 that will operate in the same way as does the construction shown in FIG. 3, but in FIG. 4 the reel and bushing are somewhat shorter in axial direction, as may be preferred when guiding a relatively small hose D.

It is to be understood that my invention actually is not limited by a particular quantity of reels that are mounted on a load wheel 15, since there will be used the reels and bushings that are desired to guide the hose or electric lines on a particular truck. Thus, there may be only one reel 18 and bushing 23, or there may be several, it merely being necessary to choose securing bolts 20 of the proper length to assemble the reels. Also, when appropriate, one or more of the reels that are assembled may have a different axial length, and the bushings assembled on the reels may have different forms, as I have illustrated for example in FIGS. 3 and 4.

I believe it will now be understood that I contribute by my invention a novel guide for hydraulic hose on an industrial truck, utilizing a bushing that will rotate on the surface of a reel whereby to prevent binding of a hose relatively to the reel, and facilitating movements of the hose. I believe, therefore, that those persons skilled in the art will understand the very considerable value of my hose guide, and will fully appreciate the merits of my invention.

I claim:

1. In a truck of the class described having a hose for conducting fluid to a fluid pressure operated mechanism, a guide wheel mounted for rotation on a bearing relatively to the truck, and a reel integrally secured in axially aligned position on one end of said guide wheel and on which said hose is reeved, said guide wheel supporting said reel for rotation with said wheel on the wheel bearing, that improvement comprising a bushing positioned between said hose and a peripheral surface of the reel for accepting binding forces that may be developed between said hose and a peripheral surface of the reel for accepting binding forces that may be developed between said hose and said reel, and said bushing being mounted for rotation on said peripheral reel surface whereby to prevent binding of the hose relative to the reel when said hose is conducting fluid under pressure.

2. In claim 1, the feature that there are two hose passing over said reel and one of said hose is in spaced relation to the particular said bushing so that the reel and said one hose may move relatively to the other hose and its bushing to allow differential motion between said two hose.

3. In the combination of claim 1, the feature that the periphery of said bushing has a depression for accepting a hose.

4. In the combination of claim 1, the feature that said reel comprises a circular flanged band applied to said one end of the guide wheel, the axis of rotation of said wheel being coincidental to the center of said band when said band is applied to said wheel end, the bushing fitting over said band so as to be held in position between its flange and the wheel end.

5. In the combination of claim 4, the feature that said guide wheel has threaded openings for bolts to secure said flanged bands to said guide wheel.

6. In the combination of claim 4, a further flanged band for a second hose adapted to be secured relatively to said first band, and a second bushing on said further flanged band lying between the flanges of the bands for guiding said second hose.

7. In the combination of claim 6, the feature that both said flanged bands are bolted into assembled relation to said guide wheel.